(12) United States Patent
Guerin et al.

(10) Patent No.: US 10,023,780 B2
(45) Date of Patent: Jul. 17, 2018

(54) 2,3,3,3-TETRAFLUOROPROPENE COMPOSITIONS HAVING IMPROVED MISCIBILITY

(71) Applicant: Arkema France, Colombes (FR)

(72) Inventors: Sophie Guerin, Francheville (FR); Wissam Rached, Chaponost (FR)

(73) Assignee: ARKEMA FRANCE, Colombes (FR)

( * ) Notice: Subject to any disclaimer, the term of this patent is extended or adjusted under 35 U.S.C. 154(b) by 142 days.

(21) Appl. No.: 14/903,461

(22) PCT Filed: Jun. 13, 2014

(86) PCT No.: PCT/FR2014/051468
§ 371 (c)(1),
(2) Date: Jan. 7, 2016

(87) PCT Pub. No.: WO2015/004353
PCT Pub. Date: Jan. 15, 2015

(65) Prior Publication Data
US 2016/0376484 A1    Dec. 29, 2016

(30) Foreign Application Priority Data
Jul. 11, 2013   (FR) ..................................... 13 56829

(51) Int. Cl.
| | | |
|---|---|---|
| C09K 5/04 | (2006.01) | |
| C09K 3/30 | (2006.01) | |
| C11D 7/06 | (2006.01) | |
| C11D 7/50 | (2006.01) | |
| C08J 9/12 | (2006.01) | |
| C08J 9/14 | (2006.01) | |
| F25B 1/00 | (2006.01) | |
| F25B 31/00 | (2006.01) | |
| F25B 45/00 | (2006.01) | |

(52) U.S. Cl.
CPC ................ C09K 5/045 (2013.01); C08J 9/12 (2013.01); C08J 9/127 (2013.01); C08J 9/142 (2013.01); C08J 9/146 (2013.01); C09K 3/30 (2013.01); C11D 7/06 (2013.01); C11D 7/509 (2013.01); C11D 7/5063 (2013.01); F25B 1/00 (2013.01); F25B 31/002 (2013.01); F25B 45/00 (2013.01); C08J 2203/12 (2013.01); C08J 2203/162 (2013.01); C08J 2203/184 (2013.01); C09K 2205/102 (2013.01); C09K 2205/126 (2013.01); C09K 2205/132 (2013.01); F25B 2400/121 (2013.01)

(58) Field of Classification Search
CPC ........ C09K 2205/102; C09K 2205/126; C09K 5/045; C10M 171/008; B03D 1/008; B03D 1/01; C10N 2040/30
USPC .......................... 252/67, 68, 69; 62/529, 467
See application file for complete search history.

(56) References Cited

U.S. PATENT DOCUMENTS

| | | | |
|---|---|---|---|
| 4,755,316 A | 7/1988 | Magid et al. | |
| 4,971,712 A | 11/1990 | Gorski et al. | |
| 4,975,212 A | 12/1990 | Thomas et al. | |
| 5,008,028 A | 4/1991 | Jolley et al. | |
| 5,595,678 A | 1/1997 | Short et al. | |
| 8,070,977 B2 | 12/2011 | Rached | |
| 8,075,798 B2 | 12/2011 | Rached | |
| 8,246,850 B2 | 8/2012 | Rached | |
| 8,252,198 B2 | 8/2012 | Rached | |
| 8,557,135 B2 * | 10/2013 | Rached .................... | C08J 9/149 252/67 |
| 8,808,569 B2 | 8/2014 | Rached | |
| 8,858,824 B2 | 10/2014 | Boussand | |
| 8,858,825 B2 * | 10/2014 | Guerin ............... | C10M 171/008 252/67 |
| 9,011,711 B2 | 4/2015 | Rached | |
| 9,028,706 B2 * | 5/2015 | Rached .................... | C08J 9/149 252/67 |
| 9,039,922 B2 | 5/2015 | Rached | |
| 9,127,191 B2 | 9/2015 | Rached | |
| 9,133,379 B2 | 9/2015 | Rached | |
| 9,175,203 B2 | 11/2015 | Rached | |
| 9,267,064 B2 | 2/2016 | Rached | |
| 9,315,708 B2 | 4/2016 | Guerin et al. | |
| 9,399,726 B2 | 7/2016 | Rached | |
| 9,505,968 B2 | 11/2016 | Rached | |
| 9,512,343 B2 | 12/2016 | Rached et al. | |

(Continued)

FOREIGN PATENT DOCUMENTS

| | | |
|---|---|---|
| CN | 101827912 A | 9/2010 |
| EP | 0 490 810 A1 | 6/1992 |

(Continued)

OTHER PUBLICATIONS

Rached, Wissam, et al., U.S. Appl. No. 15/368,347 entitled "Vehicle Heating and/or Air Conditioning Method", filed in the U.S. Patent and Trademark Office dated Dec. 2, 2016.
International Search Report (PCT/ISA/210) dated Sep. 5, 2014, by the French Patent Office as the International Searching Authority for International Application No. PCT/FR2014/051468.
Collier, Bertrand, et al., U.S. Appl. No. 15/481,815 entitled "Composition Including 2,3,3,3-Tetrafluoropropene," filed in the U.S. Patent and Trademark Office dated Apr. 7, 2017.
Deur-Bert, Dominique, et al. , U.S. Appl. No. 15/431,873 entitled "Azeotropic or Quasi-Azeotropic Composition of Chloromethane" filed in the U.S. Patent and Trademark Office dated Apr. 7, 2017.
Deur-Bert, Dominique, et al., U.S. Appl. No. 15/490,541 entitled "Composition Containing 2,3,3,3-Tetrafluoropropene and 1,2-Difluoroethylene," filed in the U.S. Patent and Trademark Office dated Apr. 18, 2017.

(Continued)

*Primary Examiner* — Douglas J McGinty
(74) *Attorney, Agent, or Firm* — Buchanan Ingersoll & Rooney P.C.

(57) ABSTRACT

The use of an alcoholic compound to improve the miscibility of ammonia with 2,3,3,3-tetrafluoropropene, as well as to compositions of ammonia, 2,3,3,3-tetrafluoropropene and an alcoholic compound, and the use thereof, in particular in heat-transfer applications. A composition including 2,3,3,3-tetrafluoropropene, ammonia and an alcoholic compound having a melting point less than or equal to 0° C.

18 Claims, No Drawings

(56) References Cited

U.S. PATENT DOCUMENTS

| | | | |
|---|---|---|---|
| 9,599,381 B2 | 3/2017 | Rached | |
| 9,650,551 B2 | 5/2017 | Collier et al. | |
| 9,650,553 B2 | 5/2017 | Deur-Bert et al. | |
| 9,663,697 B2 | 5/2017 | Rached | |
| 9,676,984 B2 | 6/2017 | Guerin et al. | |
| 9,683,155 B2 | 6/2017 | Deur-Bert et al. | |
| 9,683,157 B2 | 6/2017 | Rached | |
| 9,884,984 B2 | 2/2018 | Rached | |
| 9,908,828 B2* | 3/2018 | Rached | C07C 17/42 |
| 2004/0089839 A1 | 5/2004 | Thomas et al. | |
| 2006/0243945 A1* | 11/2006 | Minor | A62D 1/0057 252/67 |
| 2009/0241562 A1 | 10/2009 | Thomas et al. | |
| 2009/0302264 A1 | 12/2009 | Serrano et al. | |
| 2011/0084228 A1 | 4/2011 | Rached | |
| 2011/0095224 A1 | 4/2011 | Rached | |
| 2011/0186772 A1 | 8/2011 | Rached | |
| 2011/0204279 A1* | 8/2011 | Minor | A62D 1/0057 252/68 |
| 2011/0219791 A1 | 9/2011 | Rached | |
| 2011/0219792 A1* | 9/2011 | Rached | B60H 1/00907 62/79 |
| 2011/0240254 A1 | 10/2011 | Rached | |
| 2011/0284181 A1 | 11/2011 | Rached | |
| 2011/0288192 A1 | 11/2011 | Van Horn | |
| 2012/0049104 A1 | 3/2012 | Rached | |
| 2012/0056123 A1 | 3/2012 | Rached | |
| 2012/0068105 A1 | 3/2012 | Rached et al. | |
| 2012/0144857 A1 | 6/2012 | Rached | |
| 2012/0151958 A1 | 6/2012 | Rached | |
| 2012/0151959 A1 | 6/2012 | Rached | |
| 2012/0153213 A1 | 6/2012 | Rached | |
| 2012/0159982 A1 | 6/2012 | Rached | |
| 2012/0161064 A1 | 6/2012 | Rached | |
| 2012/0167615 A1 | 7/2012 | Rached | |
| 2012/0205574 A1* | 8/2012 | Rached | C08J 9/149 252/67 |
| 2013/0092869 A1 | 4/2013 | Boussand | |
| 2013/0105724 A1 | 5/2013 | Boussand | |
| 2013/0186114 A1 | 7/2013 | Guerin et al. | |
| 2014/0008565 A1 | 1/2014 | Rached et al. | |
| 2014/0075969 A1 | 3/2014 | Guerin et al. | |
| 2014/0318160 A1 | 10/2014 | Rached | |
| 2014/0326017 A1 | 11/2014 | Rached | |
| 2015/0027146 A1 | 1/2015 | Boussand | |
| 2015/0152306 A1 | 6/2015 | Rached | |
| 2015/0152307 A1 | 6/2015 | Rached | |
| 2015/0322317 A1 | 11/2015 | Collier et al. | |
| 2015/0322321 A1 | 11/2015 | Deur-Bert et al. | |
| 2015/0344761 A1 | 12/2015 | Rached | |
| 2015/0353799 A1 | 12/2015 | Deur-Bert et al. | |
| 2015/0353802 A1 | 12/2015 | Rached | |
| 2015/0377389 A1* | 12/2015 | Blondel | F16L 11/085 62/324.6 |
| 2016/0009555 A1 | 1/2016 | Bonnet et al. | |
| 2016/0024363 A1 | 1/2016 | Rached | |
| 2016/0025394 A1 | 1/2016 | Rached | |
| 2016/0115361 A1 | 4/2016 | Boussand | |
| 2016/0122609 A1 | 5/2016 | Rached | |
| 2016/0194541 A1 | 7/2016 | Guerin et al. | |
| 2016/0244652 A1 | 8/2016 | Rached | |
| 2016/0272561 A1 | 9/2016 | Rached et al. | |
| 2016/0298014 A1 | 10/2016 | Rached | |
| 2016/0355718 A1 | 12/2016 | Rached | |
| 2017/0037291 A1 | 2/2017 | Rached et al. | |
| 2017/0080773 A1* | 3/2017 | Rached | B60H 1/004 |
| 2017/0145276 A1 | 5/2017 | Rached | |
| 2017/0210960 A1 | 7/2017 | Deur-Bert et al. | |
| 2017/0210962 A1 | 7/2017 | Collier et al. | |
| 2017/0218241 A1 | 8/2017 | Deur-Bert et al. | |
| 2017/0218242 A1 | 8/2017 | Rached | |

FOREIGN PATENT DOCUMENTS

| | | | |
|---|---|---|---|
| EP | 0 699 737 A2 | 3/1996 | |
| EP | 2 487 216 A1 | 8/2012 | |
| EP | 2487216 B1 * | 11/2015 | C08J 9/149 |
| WO | WO 2004/037913 A2 | 5/2004 | |
| WO | WO 2004/037913 A3 | 5/2004 | |
| WO | WO 2005/042663 A1 | 5/2005 | |
| WO | WO 2006/094303 A2 | 9/2006 | |
| WO | WO 2007/126414 A2 | 11/2007 | |
| WO | WO 2008/009922 A2 | 1/2008 | |
| WO | WO 2008/009928 A2 | 1/2008 | |
| WO | WO 2008/027555 A2 | 3/2008 | |
| WO | WO 2008/027555 A3 | 3/2008 | |

OTHER PUBLICATIONS

Rached, Wissam, U.S. Appl. No. 15/491,717 entitled "Heat Transfer Method," filed in the U.S. Patent and Trademark Office dated Apr. 19, 2017.

Rached, Wissam, U.S. Appl. No. 15/396,355 entitled "Heat Transfer Fluid," filed in the U.S. Patent and Trademark Office dated Jan. 3, 2017.

Boussand, Beatrice, et al., U.S. Appl. No. 14/990,159, entitled "Stable 2,3,3,3-Tetrafluoropropene Composition," filed in the U.S. Patent and Trademark office dated Jan. 7, 2016.

Rached, Wissam, U.S. Appl. No. 14/992,387 entitled, "Ternary Compositions for High-Capacity Refrigeration," filed in the U.S. Patent and Trademark Office dated Jan. 11, 2016.

Guerin, Sophie, et al., U.S. Appl. No. 15/070,955, entitled "Heat-Transfer Compositions Exhibiting Improved Miscibility with the Lubricating Oil," filed in the U.S. Patent and Trademark Office dated Mar. 15, 2016.

Rached, Wissam, et al., U.S. Appl. No. 15/073,108 entitled "Stabilization of 1-Chloro-3,3,3-Trifluoropropene," filed in the U.S. Patent and Trademark Office dated Mar. 17, 2016.

Rached, Wissam, U.S. Appl. No. 15/238,883 entitled "Heat Transfer Fluid Replacing R-134a," filed in the U.S. Patent and Trademark Office dated Aug. 17, 2016.

Rached, Wissam, et al., U.S. Appl. No. 15/297,569 entitled "Composition Based on 2,3,3,3-Tetrafluoropropene," filed in the U.S. Patent and Trademark Office dated Oct. 19, 2016.

Ajavon et al., "Scientific Assessment of Ozone Depletion: 2002," World Meteorological Organization Global Ozone Research and Monitoring Project—Report No. 47, 485 pages.

Rached, Wissam, U.S. Appl. No. 15/809,164 entitled "Vehicle Heating and/or Air Conditioning Method," filed in the U.S. Patent and Trademark Office dated Nov. 10, 2017.

Rached, Wissam, U.S. Appl. No. 15/820,996 entitled "Method for Heating and/or Air Conditioning a Vehicle," filed in the U.S. Patent and Trademark Office dated Nov. 22, 2017.

Rached, Wissam, U.S. Appl. No. 15/856,703 entitled "Binary Refrigerating Fluid," filed in the U.S. Patent and Trademark Office dated Dec. 28, 2017.

Rached, Wissam, et al., U.S. Appl. No. 15/878,794 entitled "Stabilization of 1-Chloro-3,3,3-Trifluoropropene," filed in the U.S. Patent and Trademark Office dated Jan. 24, 2018.

* cited by examiner

2,3,3,3-TETRAFLUOROPROPENE COMPOSITIONS HAVING IMPROVED MISCIBILITY

FIELD OF THE INVENTION

The present invention relates to the use of alcoholic compounds for improving the miscibility of compositions based on 2,3,3,3-tetrafluropropene and the use of these compositions notably for heat transfer.

TECHNICAL BACKGROUND

Fluids based on fluorocarbon compounds are widely used in systems for heat transfer by vapor compression, notably air conditioning equipment, heat pumps, devices for refrigeration or for freezing. These devices have in common that they are based on a thermodynamic cycle comprising vaporization of the fluid at low pressure (in which the fluid absorbs heat); compression of the vaporized fluid to a high pressure; condensation of the vaporized fluid to liquid at high pressure (in which the fluid gives up heat); and expansion of the fluid to end the cycle.

The choice of a heat transfer fluid (which may be a pure compound or a mixture of compounds) is dictated on the one hand by the thermodynamic properties of the fluid, and on the other hand by additional constraints. Thus, a particularly important criterion is the effect that the fluid considered has on the environment. In particular, chlorinated compounds (chlorofluorocarbons and hydrochlorofluorocarbons) have the disadvantage that they damage the ozone layer. Therefore from now on generally nonchlorinated compounds are preferred, such as hydrofluorocarbons, fluoroethers and fluoroolefins.

Another environmental constraint is the global warming potential (GWP). It is therefore essential to develop heat transfer compositions having a GWP as low as possible, and with good energy performance.

Document WO 2006/094303 describes a large number of heat transfer compositions comprising fluoroolefins, and notably 2,3,3,3-tetrafluoropropene (HFO-1234yf), and additional compounds.

Document WO 2007/126414 describes a large number of mixtures of heat transfer compounds, and notably mixtures comprising 2,3,3,3-tetrafluoropropene (HFO-1234yf) and ammonia.

Documents WO 2008/009928 and WO 2008/009922 describe heat transfer compositions based on pentafluoropropene, tetrafluoropropene and at least one additional compound, which may be ammonia.

Document US 2006/0243945 describes a large number of mixtures of heat transfer compounds, and notably quaternary compositions based on HFO-1234yf, ammonia, difluoromethane (HFC-32) and trifluoroiodomethane.

Document EP 2487216 describes azeotropic or quasi-azeotropic binary compositions of HFO-1234yf and ammonia.

The mixture of HFO-1234yf and ammonia represents an advantageous composition, notably for heat transfer applications—in particular because HFO-1234yf is a very interesting compound in view of its low GWP and its good energy performance. However, the miscibility of the two compounds is limited. Thus, the azeotropic mixture consisting of 78% of HFO-1234yf and 22% of ammonia undergoes demixing at a temperature less than or equal to about −21° C.

It is therefore desirable to develop compositions based on HFO-1234yf and ammonia having improved miscibility.

SUMMARY OF THE INVENTION

The invention relates firstly to a composition comprising 2,3,3,3-tetrafluoropropene, ammonia and an alcoholic compound having a melting point less than or equal to 0° C.

According to one embodiment, the alcoholic compound has a melting point less than or equal to −50° C., preferably less than or equal to −80° C.; and/or the alcoholic compound has a viscosity at 20° C. less than or equal to 32.5 mm$^2$/s, preferably less than or equal to 15 mm$^2$/s and more especially preferably less than or equal to 5 mm$^2$/s.

According to one embodiment, the alcoholic compound is a primary alcohol of formula $R_1$—$CH_2$—OH, or a secondary alcohol of formula $R_2R_3$—CH—OH, or a tertiary alcohol of formula $R_4R_5R_6$—C—OH, or an enol of formula $R_7R_8C$=$CR_9OH$, or a phenol of formula $R_{10}$—OH, the groups $R_1$, $R_2$, $R_3$, $R_4$, $R_5$, $R_6$, $R_7$, $R_8$ and $R_9$ each representing independently a linear or branched alkyl group comprising from 1 to 20 carbon atoms, preferably from 1 to 10 carbon atoms and more especially preferably from 1 to 7 carbon atoms, optionally substituted partially or completely with F, Br, Cl or OH; and $R_{10}$ represents a benzene ring optionally substituted partially or completely with F, Br, Cl, OH or with alkyl groups as defined above.

According to one embodiment, the alcoholic compound is selected from propan-1-ol, propan-2-ol, 2-perfluorohexylethanol, 1,1,1,3,3,3-hexafluoropropan-2-ol and mixtures thereof.

According to one embodiment, the composition comprises:
  from 1 to 60% of ammonia and from 40 to 99% of 2,3,3,3-tetrafluoropropene;
  preferably from 5 to 45% of ammonia and from 55 to 95% of 2,3,3,3-tetrafluoropropene;
  preferably from 15 to 30% of ammonia and from 70 to 85% of 2,3,3,3-tetrafluoropropene;
  preferably from 18 to 26% of ammonia and from 74 to 82% of 2,3,3,3-tetrafluoropropene;
  preferably from 21 to 23% of ammonia and from 77 to 79% of 2,3,3,3-tetrafluoropropene;
the proportions being given relative to the sum of ammonia and 2,3,3,3-tetrafluoropropene.

According to one embodiment, the alcoholic compound is present in a proportion from 0.1 to 20%, preferably from 0.5 to 10%, preferably from 1 to 5%, relative to the sum of the alcoholic compound, ammonia and 2,3,3,3-tetrafluoropropene.

According to one embodiment, the composition consists essentially of a mixture of ammonia, of 2,3,3,3-tetrafluoropropene and of the alcoholic compound.

According to one embodiment, the composition has a demixing temperature less than or equal to −23° C., preferably less than or equal to −25° C., preferably less than or equal to −27° C., preferably less than or equal to −29° C., preferably less than or equal to −31° C., preferably less than or equal to −33° C., preferably less than or equal to −35° C.

According to one embodiment, the composition further comprises one or more additives selected from lubricants and preferably polyalkylene glycols, stabilizers, tracers, fluorescent agents, odoriferous agents, solubilizers and mixtures thereof.

The invention also relates to the use of the composition as described above, as a heat transfer composition.

The invention also relates to the use of an alcoholic compound for improving the miscibility of ammonia with 2,3,3,3-tetrafluoropropene.

According to one embodiment, the alcoholic compound has a melting point less than or equal to 0° C., preferably less than or equal to −50° C., more especially preferably less than or equal to −80° C.; and/or the alcoholic compound has a viscosity at 20° C. less than or equal to 32.5 mm²/s, preferably less than or equal to 15 mm²/s and more especially preferably less than or equal to 5 mm²/s.

According to one embodiment, the alcoholic compound is a primary alcohol of formula $R_1$—$CH_2$—OH, or a secondary alcohol of formula $R_2R_3$—CH—OH, or a tertiary alcohol of formula $R_4R_5R_6$—C—OH, or an enol of formula $R_7R_8C$=$CR_9OH$, or a phenol of formula $R_{10}$—OH, the groups $R_1$, $R_2$, $R_3$, $R_4$, $R_5$, $R_6$, $R_7$, $R_8$ and $R_9$ each representing independently a linear or branched alkyl group comprising from 1 to 20 carbon atoms, preferably from 1 to 10 carbon atoms and more especially preferably from 1 to 5 carbon atoms, optionally substituted partially or completely with F, Br, Cl or OH; and $R_{10}$ represents a benzene ring optionally substituted partially or completely with F, Br, Cl, OH or with alkyl groups as defined above.

According to one embodiment, the alcoholic compound is selected from propan-1-ol, propan-2-ol, 2-perfluorohexylethanol, 1,1,1,3,3,3-hexafluoropropan-2-ol and mixtures thereof.

According to one embodiment, ammonia and 2,3,3,3-tetrafluoropropene are combined in a mixture comprising:

from 1 to 60% of ammonia and from 40 to 99% of 2,3,3,3-tetrafluoropropene;
preferably from 5 to 45% of ammonia and from 55 to 95% of 2,3,3,3-tetrafluoropropene;
preferably from 15 to 30% of ammonia and from 70 to 85% of 2,3,3,3-tetrafluoropropene;
preferably from 18 to 26% of ammonia and from 74 to 82% of 2,3,3,3-tetrafluoropropene;
preferably from 21 to 23% of ammonia and from 77 to 79% of 2,3,3,3-tetrafluoropropene.

According to one embodiment, the alcoholic compound is added to a mixture of ammonia and 2,3,3,3-tetrafluoropropene in a proportion from 0.1 to 20%, preferably from 0.5 to 10%, preferably from 1 to 5%, relative to the sum of the three compounds.

According to one embodiment, ammonia and 2,3,3,3-tetrafluoropropene are not combined with any third heat transfer compound.

The invention also relates to a heat transfer installation comprising a vapor compression circuit containing a composition as described above as the heat transfer composition.

According to one embodiment, the installation is selected from mobile or stationary installations for heating by heat pump, for air conditioning, for refrigeration, for freezing and the Rankine cycles, and notably automobile air conditioning installations.

According to one embodiment, the installation is an automobile air conditioning installation.

The invention also relates to a method for heating or cooling a fluid or a body by means of a vapor compression circuit containing a heat transfer fluid, said method comprising successively at least partial evaporation of the heat transfer fluid, compression of the heat transfer fluid, at least partial condensation of the heat transfer fluid and expansion of the heat transfer fluid, in which the heat transfer fluid is supplied by a composition as described above.

The invention also relates to a method for reducing the environmental impact of a heat transfer installation comprising a vapor compression circuit containing an initial heat transfer fluid, said method comprising a step of replacing the initial heat transfer fluid in the vapor compression circuit with a final heat transfer fluid, the final heat transfer fluid having a lower GWP than the initial heat transfer fluid, in which the final heat transfer fluid is supplied by a composition as described above.

The invention also relates to the use of the composition described above as a solvent.

The invention also relates to the use of the composition described above as an expanding agent.

The invention also relates to the use of the composition described above as a propellant, preferably for an aerosol.

The invention also relates to the use of the composition described above as a cleaning agent.

The present invention makes it possible to respond to the needs felt in the prior art. More particularly it supplies compositions based on HFO-1234yf and ammonia with improved miscibility.

This is achieved owing to the use of alcoholic compounds as compatibilizing additives. It was found, surprisingly, that these additives make it possible to improve the miscibility of the HFO-1234/ammonia mixture, whereas other surfactant compounds do not improve it, or make it worse, or even are incompatible with the mixture.

DESCRIPTION OF EMBODIMENTS OF THE INVENTION

The invention will now be described in more detail and nonexhaustively in the description that follows.

Unless stated otherwise, throughout this application the proportions of compounds indicated are given in percentages by weight.

According to the present application, the global warming potential (GWP) is defined with respect to carbon dioxide and with respect to a time of 100 years, by the method stated in "*The scientific assessment of ozone depletion, 2002, a report of the World Meteorological Association's Global Ozone Research and Monitoring Project*".

"Heat transfer compound", or "heat transfer fluid" (or refrigerant) means a compound, or a fluid, capable of absorbing heat on evaporating at low temperature and low pressure and of giving up heat on condensing at high temperature and high pressure, in a vapor compression circuit. In general, a heat transfer fluid may comprise just one, two, three or more than three heat transfer compounds.

"Heat transfer composition" means a composition comprising a heat transfer fluid and optionally one or more additives that are not heat transfer compounds for the application envisaged.

The invention is based on the use of two heat transfer compounds, namely HFO-1234yf and ammonia, and a compatibilizing additive, namely an alcoholic compound, to form heat transfer compositions, optionally with other additives and notably lubricants.

The heat transfer composition can be introduced as it is into a vapor compression circuit. Alternatively, on the one hand the heat transfer fluid (comprising HFO-1234yf and ammonia) with the compatibilizing additive, and on the other hand other additives (notably lubricant), may be introduced separately into the circuit, at the same point or not. Moreover, on the one hand the heat transfer fluid (comprising HFO-1234yf and ammonia), and on the other hand the compatibilizing additive, optionally with other additives and notably a lubricant, may be introduced separately. The individual heat transfer compounds (HFO-1234yf and ammonia) may also be introduced separately.

The heat transfer compounds mainly used in the context of the present invention are HFO-1234yf and ammonia.

However, the heat transfer compositions according to the invention may optionally comprise one or more additional heat transfer compounds, besides HFO-1234yf and ammonia. These additional heat transfer compounds may notably be selected from hydrocarbons, hydrofluorocarbons, ethers, hydrofluoroethers and fluoroolefins.

According to particular embodiments, the heat transfer fluids according to the invention may be ternary compositions (consisting of three heat transfer compounds) or quaternary compositions (consisting of four heat transfer compounds), together with the lubricant to form the heat transfer compositions according to the invention.

However, the binary heat transfer fluids are preferred.

Binary fluid means either a fluid consisting of a mixture of HFO-1234yf and ammonia; or a fluid consisting essentially of a mixture of HFO-1234yf and ammonia, but which may contain impurities at a rate of less than 1%, preferably less than 0.5%, preferably less than 0.1%, preferably less than 0.05% and preferably less than 0.01%.

According to particular embodiments, the proportion of HFO-1234yf in the heat transfer fluid may be: from 0.1 to 5%; or from 5 to 10%; or from 10 to 15%; or from 15 to 20%; or from 20 to 25%; or from 25 to 30%; or from 30 to 35%; or from 35 to 40%; or from 40 to 45%; or from 45 to 50%; or from 50 to 55%; or from 55 to 60%; or from 60 to 65%; or from 65 to 70%; or from 70 to 75%; or from 75 to 80%; or from 80 to 85%; or from 85 to 90%; or from 90 to 95%; or from 95 to 99.9%.

According to particular embodiments, the proportion of ammonia in the heat transfer fluid may be: from 0.1 to 5%; or from 5 to 10%; or from 10 to 15%; or from 15 to 20%; or from 20 to 25%; or from 25 to 30%; or from 30 to 35%; or from 35 to 40%; or from 40 to 45%; or from 45 to 50%; or from 50 to 55%; or from 55 to 60%; or from 60 to 65%; or from 65 to 70%; or from 70 to 75%; or from 75 to 80%; or from 80 to 85%; or from 85 to 90%; or from 90 to 95%; or from 95 to 99.9%.

The values given in the three preceding paragraphs apply to the heat transfer fluid without additives, and not to the heat transfer composition that comprises the heat transfer fluid, the compatibilizing additive and optionally other additives.

It may be preferable not to have too high a proportion of $NH_3$ in the mixture, in the context of use as a heat transfer fluid, in order to avoid an excessive temperature increase at compressor outlet.

Some of the above heat transfer fluids have the advantage of being azeotropic or quasi-azeotropic. For example, it has been found that the azeotrope for the binary mixture HFO-1234yf/$NH_3$ is obtained for a proportion of $NH_3$ of about 23% (±2%), at a temperature of 5° C. (±1° C.) and at a pressure of 7.3 bar (±1 bar).

"Quasi-azeotropic" describes compositions for which, at constant temperature, the liquid saturation pressure and the vapor saturation pressure are almost identical (the maximum pressure difference being 10%, or even advantageously 5%, relative to the liquid saturation pressure).

For "azeotropic" compositions, at constant temperature, the maximum pressure difference is close to 0%.

These heat transfer fluids offer the advantage of ease of use. In the absence of a significant temperature lapse, there is no significant change in the circulating composition, nor any significant change in the composition in the case of leaks.

Moreover, certain compositions according to the invention have improved performance relative to R404A (mixture of 52% of 1,1,1-trifluoroethane, 44% of pentafluoroethane and 4% of 1,1,1,2-tetrafluoroethane) and/or to R410A (mixture of 50% of difluoromethane and 50% of pentafluoroethane), in particular for methods of cooling to moderate temperature, i.e. those in which the temperature of the fluid or of the body cooled is from −15° C. to 15° C., preferably from −10° C. to 10° C., more especially preferably from −5° C. to 5° C. (ideally about 0° C.). In this respect, the compositions for which the proportion of $NH_3$ is greater than or equal to 15% are particularly preferred, notably the compositions having a proportion of $NH_3$ from 15 to 30%, preferably from 18 to 26%.

Furthermore, certain compositions according to the invention have improved performance relative to R410A, in particular for methods of heating to a moderate temperature, i.e. those in which the temperature of the fluid or of the body heated is from 30° C. to 80° C., and preferably from 35° C. to 55° C., more especially preferably from 40° C. to 50° C. (ideally about 45° C.). In this respect, the compositions for which the proportion of $NH_3$ is greater than or equal to 15% are particularly preferred, notably the compositions having a proportion of $NH_3$ from 20 to 30%.

The compatibilizing additive used in the context of the present invention is an alcoholic compound, i.e. an organic compound having at least one alcohol function —OH. The compound may comprise a single alcohol function or several (polyol, or glycol).

The alcoholic compound may notably be a primary alcohol of formula $R_1$—$CH_2$—OH, or a secondary alcohol of formula $R_2R_3$—CH—OH, or a tertiary alcohol of formula $R_4R_5R_6$—C—OH, or an enol of formula $R_7R_8C$=$CR_9OH$, or a phenol of formula $R_{10}$—OH.

Preferably it is a primary alcohol of formula $R_1$—$CH_2$—OH, or a secondary alcohol of formula $R_2R_3$—CH—OH, or a tertiary alcohol of formula $R_4R_5R_6$—C—OH.

The above groups $R_1$, $R_2$, $R_3$, $R_4$, $R_5$, $R_6$, $R_7$, $R_8$ and $R_9$ each represent independently a linear or branched alkyl group comprising from 1 to 20 carbon atoms, or from 1 to 15 carbon atoms, or from 1 to 12 carbon atoms, or from 1 to 10 carbon atoms, or from 1 to 9 carbon atoms, or from 1 to 8 carbon atoms, or from 1 to 7 carbon atoms, or from 1 to 6 carbon atoms, or from 1 to 5 carbon atoms, or from 1 to 4 carbon atoms, or from 1 to 3 carbon atoms.

Each of these groups may be substituted partially or completely with F, Br, Cl or OH, preferably with F, Br or Cl.

The group $R_{10}$ represents a benzene ring optionally substituted partially or completely with F, Br, Cl, OH or with one or more alkyl groups as defined above.

According to a particular embodiment, the alcoholic compound is a primary alcohol of formula $R_1$—$CH_2$—OH, or a secondary alcohol of formula $R_2R_3$—CH—OH, or a tertiary alcohol of formula $R_4R_5R_6$—C—OH, each group $R_1$, $R_2$, $R_3$, $R_4$, $R_5$, $R_6$ representing a linear alkyl group comprising from 1 to 8 carbon atoms, optionally substituted partially or completely with fluorine atoms.

For reasons of compatibility with certain of the applications described (notably in the area of heat transfer), compounds are mainly used that have a melting point less than or equal to 0° C.; or less than or equal to −5° C.; or less than or equal to −10° C.; or less than or equal to −15° C.; or less than or equal to −20° C.; or less than or equal to −25° C.; or less than or equal to −30° C.; or less than or equal to −35°

C.; or less than or equal to −40° C.; or less than or equal to −45° C.; or less than or equal to −50° C.; or less than or equal to −55° C.; or less than or equal to −60° C.; or less than or equal to −65° C.; or less than or equal to −70° C.; or less than or equal to −75° C.; or less than or equal to −80° C.; or less than or equal to −85° C.; or less than or equal to −90° C.

The melting point is determined according to standard ISO 1392:1977.

According to one embodiment, the compatibilizing additive (alcoholic compound) is not a lubricant or a lubricating oil. In particular, advantageously it has a viscosity less than or equal to 32.5 mm$^2$/s, or 30 mm$^2$/s, or 27.5 mm$^2$/s, or 25 mm$^2$/s, or 22.5 mm$^2$/s, or 20 mm$^2$/s, or 17.5 mm$^2$/s, or 15 mm$^2$/s, or 12.5 mm$^2$/s, or 10 mm$^2$/s, or 7.5 mm$^2$/s, or 5 mm$^2$/s, or 2.5 mm$^2$/s.

The (kinematic) viscosity is determined at 20° C. according to standard ISO 3104:1976.

As an example, propan-1-ol, propan-2-ol, 2-perfluorohexylethanol, 1,1,1,3,3,3-hexafluoropropan-2-ol or a combination thereof may be used. Propan-1-ol and propan-2-ol are particularly preferred, and quite particularly propan-1-ol.

The proportion of compatibilizing additive, relative to the sum of HFO-1234yf, ammonia, and the compatibilizing additive itself, may be from 0.1 to 0.5%; or from 0.5 to 1.0%; or from 1.0 to 1.5%; or from 1.5 to 2.0%; or from 2.0 to 2.5%; or from 2.5 to 3.0%; or from 3.0 to 3.5%; or from 3.5 to 4.0%; or from 4.0 to 4.5%; or from 4.5 to 5.0%; or from 5.0 to 5.5%; or from 5.5 to 6.0%; or from 6.0 to 6.5%; or from 6.5 to 7.0%: or from 7.0 to 7.5%; or from 7.5 to 8.0%; or from 8.0 to 8.5%; or from 8.5 to 9.0%; or from 9.0 to 9.5%; or from 9.5 to 10.0%; from 10.0 to 10.5%; or from 10.5 to 11.0%; or from 11.0 to 11.5%; or from 11.5 to 12.0%; or from 12.0 to 12.5%; or from 12.5 to 13.0%; or from 13.0 to 13.5%; or from 13.5 to 14.0%; or from 14.0 to 14.5%; or from 14.5 to 15.0%; or from 15.0 to 15.5%; or from 15.5 to 16.0%; or from 16.0 to 16.5%; or from 16.5 to 17.0%: or from 17.0 to 17.5%; or from 17.5 to 18.0%; or from 18.0 to 18.5%; or from 18.5 to 19.0%; or from 19.0 to 19.5%; or from 19.5 to 20.0%.

The compatibilizing additive makes it possible to improve the miscibility of the HFO-1234yf/ammonia mixture, i.e. to lower the temperature of demixing of the mixture, the demixing temperature being defined as the temperature starting from which formation of an emulsion is observed (starting from a homogeneous mixture without emulsion of HFO-1234yf/ammonia and gradually lowering its temperature).

The compatibilizing additive may be added to one or other of the compounds HFO-1234yf and ammonia before mixing them, or else may be added to the mixture of the two compounds.

The other additives that may be used in the context of the invention may notably be selected from lubricants, stabilizers, tracers, fluorescent agents, odoriferous agents and solubilizers.

According to one embodiment, none of these other possible additives is an alcoholic compound as defined above.

As lubricants, we may notably use oils of mineral origin, silicone oils, paraffins of natural origin, naphthenes, synthetic paraffins, alkylbenzenes, poly-alphaolefins, polyalkylene glycols, polyol esters and/or polyvinyl ethers.

The polyalkylene glycols represent preferred lubricants (or lubricating oils).

The polyalkylene glycol in the sense of the invention may comprise polyalkylene glycols of different formulas mixed together.

In general, the appropriate polyalkylene glycol to be used in the context of the invention comprises from 5 to 50 oxyalkylene repeating units, each containing from 1 to 5 carbon atoms.

The polyalkylene glycol may be linear or branched. It may be a homopolymer or a copolymer of 2, 3 or more than 3 groups selected from oxyethylene, oxypropylene, oxybutylene, oxypentylene groups and combinations thereof.

Preferred polyalkylene glycols comprise at least 50% of oxypropylene groups.

Suitable polyalkylene glycols are described in document U.S. Pat. No. 4,971,712. Other suitable polyalkylene glycols are the polyalkylene glycols having hydroxyl groups at each end, as described in document U.S. Pat. No. 4,755,316. Other suitable polyalkylene glycols are the polyalkylene glycols having a capped hydroxyl end group. The hydroxyl group may be capped with an alkyl group containing from 1 to 10 carbon atoms (and optionally containing one or more heteroatoms such as nitrogen), or a fluoroalkyl group containing heteroatoms such as nitrogen, or a fluoroalkyl group as described in document U.S. Pat. No. 4,975,212, or other similar groups.

When the two hydroxyl end groups of the polyalkylene glycol are capped, it is possible to use the same end group or a combination of two different groups.

The hydroxyl end groups may also be capped by forming an ester with a carboxylic acid, as is described in document U.S. Pat. No. 5,008,028. The carboxylic acid may also be fluorinated.

When the two ends of the polyalkylene glycol are capped, one or other may be capped with an ester, or else one end may be capped with an ester and the other end may be free or may be capped with one of the aforementioned alkyl, heteroalkyl or fluoroalkyl groups.

Polyalkylene glycols usable as lubricating oils and commercially available are for example the oils Goodwrench from General Motors, MOPAR-56 from Daimler-Chrysler, Zerol from Shrieve Chemical Products, Planetelf PAG from Total and Daphne Hermetic PAG from Itemitsu. Other suitable polyalkylene glycols are manufactured by Dow Chemical and Denso. We may also mention the oils manufactured by Fuchs and notably the oil RENISO PG 68/NH3.

The viscosity of the polyalkylene glycol may be for example from 1 to 1000 centistokes at 40° C., preferably from 10 to 200 centistokes at 40° C. and more especially preferably from 30 to 80 centistokes at 40° C.

The viscosity is determined according to the ISO viscosity grades, according to standard ASTM D2422.

The oil marketed by Denso under the name NDB, having a viscosity of 46 centistokes, is particularly suitable.

The proportion of lubricating oil that must be used in combination with the heat transfer fluid mainly depends on the type of installation in question. In fact, the total amount of lubricating oil in the installation mainly depends on the nature of the compressor, whereas the total amount of heat transfer fluid in the installation mainly depends on the exchangers and the pipework.

In general, the proportion of lubricating oil in the heat transfer composition, or in other words relative to the sum of the lubricating oil and of the heat transfer fluid, is from 1 to 99%, preferably from 5 to 50%, for example from 10 to 40% or from 15 to 35%.

According to a particular embodiment, the lubricating oil used consists of the polyalkylene glycol described above, with the exception of any other lubricating compound.

According to an alternative embodiment, another lubricating oil is used in combination with the polyalkylene glycol. It may notably be selected from oils of mineral origin, silicone oils, paraffins of natural origin, naphthenes, synthetic paraffins, alkylbenzenes, poly-alphaolefins, esters of polyols and/or polyvinyl ethers. The esters of polyols and the polyvinyl ethers are preferred.

The stabilizer or stabilizers, when present, preferably represent at most 5 wt % in the heat transfer composition. Among the stabilizers, we may notably mention nitromethane, ascorbic acid, terephthalic acid, azoles such as tolutriazole or benzotriazole, phenolic compounds such as tocopherol, hydroquinone, t-butyl hydroquinone, 2,6-di-tert-butyl-4-methylphenol, epoxides (alkyl optionally fluorinated or perfluorinated or alkenyl or aromatic) such as n-butylglycidyl ether, hexanedioldiglycidyl ether, allylglycidyl ether, butylphenylglycidyl ether, phosphites, phosphonates, thiols and lactones. The stabilizer is different from the heat transfer compound or compounds constituting the heat transfer fluid and is different from the compatibilizing additive.

As tracers (capable of being detected) we may mention hydrofluorocarbons, whether or not deuterated, deuterated hydrocarbons, perfluorocarbides, fluoroethers, brominated compounds, iodinated compounds, aldehydes, ketones, nitrous oxide and combinations thereof. The tracer is different from the heat transfer compound or compounds constituting the heat transfer fluid and different from the compatibilizing additive.

As solubilizers, we may mention hydrocarbons, dimethyl ether, polyoxyalkylene ethers, amides, ketones, nitriles, chlorocarbides, esters, lactones, aryl ethers, fluoroethers and 1,1,1-trifluoroalkanes. The solubilizer is different from the heat transfer compound or compounds constituting the heat transfer fluid and different from the compatibilizing additive.

As fluorescent agents, we may mention naphthalimides, perylenes, coumarins, anthracenes, phenanthracenes, xanthenes, thioxanthenes, naphthoxanthenes, fluoresceins and derivatives and combinations thereof. The fluorescent agent is different from the heat transfer compound or compounds constituting the heat transfer fluid and different from the compatibilizing additive.

As odoriferous agents, we may mention alkyl acrylates, allyl acrylates, acrylic acids, acrylic esters, alkyl ethers, alkyl esters, alkynes, aldehydes, thiols, thioethers, disulfides, allylisothiocyanates, alkanoic acids, amines, norbornenes, derivatives of norbornenes, cyclohexene, aromatic heterocyclic compounds, ascaridole, o-methoxy (methyl)phenol and combinations thereof. The odoriferous agent is different from the heat transfer compound or compounds constituting the heat transfer fluid and different from the compatibilizing additive.

The method of heat transfer according to the invention is based on the use of an installation comprising a vapor compression circuit that contains a heat transfer composition as described above. The method of heat transfer may be a method for heating or cooling a fluid or a body.

The vapor compression circuit comprises at least one evaporator, a compressor, a condenser and a pressure reducing valve, as well as lines for conveying fluid between these elements. The evaporator and the condenser comprise a heat exchanger allowing heat exchange between the heat transfer fluid and another fluid or body.

The compressor used may notably be a single-stage or multistage centrifugal compressor or a mini-centrifugal compressor. Rotary, piston or screw compressors may also be used. The compressor may be driven by an electric motor or by a gas turbine (for example fed by the vehicle exhaust gases, for mobile applications) or by a gear train.

The installation may comprise a turbine for generating electricity (Rankine cycle).

The installation may also optionally comprise at least one circuit of heat-transfer fluid used for transmitting heat (with or without change of state) between the circuit of the heat transfer fluid and the fluid or body to be heated or cooled.

The installation may also optionally comprise two (or more) vapor compression circuits, containing identical or different heat transfer fluids. For example, the vapor compression circuits may be coupled together.

The vapor compression circuit functions according to a conventional vapor compression cycle. The cycle comprises the change of state of the heat transfer fluid from a liquid phase (or two-phase liquid/vapor) to a vapor phase at a relatively low pressure, then compression of the fluid in the vapor phase to a relatively high pressure, change of state (condensation) of the heat transfer fluid from the vapor phase to the liquid phase at a relatively high pressure, and reduction of the pressure to begin the cycle again.

In the case of a method of cooling, the heat from the fluid or body that is being cooled (directly or indirectly, via a heat-transfer fluid) is absorbed by the heat transfer fluid, during evaporation of the latter, at a relatively low temperature relative to the surroundings. The methods of cooling comprise the methods for air conditioning (with mobile installations, for example in vehicles, or stationary), for refrigeration and for freezing or for cryogenics.

In the case of a method of heating, heat is given up (directly or indirectly, via a heat-transfer fluid) from the heat transfer fluid, during condensation of the latter, to the fluid or to the body that is being heated, at a relatively high temperature relative to the surroundings. The installation allowing heat transfer to take place is called in this case a "heat pump".

It is possible to use any type of heat exchanger for using the heat transfer fluids according to the invention, and notably co-current heat exchangers or, preferably, counter-current heat exchangers. It is also possible to use exchangers with micro-channels.

The invention makes it possible in particular to implement methods of cooling at moderate temperature, i.e. in which the temperature of the fluid or of the body cooled is from −15° C. to 15° C., preferably from −10° C. to 10° C., more especially preferably from −5° C. to 5° C. (ideally about 0° C.).

The invention also makes it possible to implement methods of heating at moderate temperature, i.e. in which the temperature of the fluid or of the body heated is from 30° C. to 70° C., and preferably from 35° C. to 55° C., more especially preferably from 40° C. to 50° C. (ideally about 45° C.).

In the methods of "cooling or heating at moderate temperature" mentioned above, the temperature of the heat transfer fluid at evaporator inlet is preferably from −20° C. to 10° C., notably from −15° C. to 5° C., more especially preferably from −10° C. to 0° C. and for example is about −5° C.; and the temperature of the start of condensation of the heat transfer fluid at the condenser is preferably from 25° C. to 80° C., notably from 30° C. to 70° C., more especially preferably from 35° C. to 55° C. and for example about 50° C. These methods may be methods of refrigeration, of air conditioning or of heating.

The invention also makes it possible to implement methods of heating at high temperature, i.e. in which the temperature of the fluid or of the body heated is above 90° C., for example greater than or equal to 100° C. or greater than or equal to 110° C., and preferably less than or equal to 120° C.

The invention also makes it possible to implement methods of low-temperature refrigeration, i.e. in which the temperature of the fluid or of the body cooled is from −40° C. to −10° C., and preferably from −35° C. to −25° C., more especially preferably from −30° C. to −20° C. (ideally about −25° C.). In this respect, the compositions for which the proportion of $NH_3$ is greater than or equal to 15% are particularly preferred, notably the compositions having a proportion of $NH_3$ from 18 to 24%.

In the methods of "low-temperature refrigeration" mentioned above, the temperature of the heat transfer fluid at evaporator inlet is preferably from −45° C. to −15° C., notably from −40° C. to −20° C., more especially preferably from −35° C. to −25° C. and for example about −30° C.; and the temperature of the start of condensation of the heat transfer fluid at the condenser is preferably from 25° C. to 80° C., notably from 30° C. to 60° C., more especially preferably from 35° C. to 55° C. and for example about 40° C.

According to a preferred embodiment, throughout the cycle the heat transfer fluid is at a temperature at which it is miscible. For example, throughout the cycle the heat transfer fluid is at a temperature between −20° C. and 70° C.

It should be noted that addition of the compatibilizing additive to the heat transfer fluid improves the miscibility of the heat transfer fluid, i.e. lowers the demixing temperature (threshold temperature of appearance of the region of non-miscibility, below which the compounds in liquid phase form an emulsion), and therefore makes it possible to increase the possibilities of using the heat transfer fluid, for example with use at a lower evaporation temperature.

More generally, the invention makes it possible to proceed with replacement of any heat transfer fluid in all heat transfer applications, and for example in automobile air conditioning. For example, the heat transfer fluids and heat transfer compositions according to the invention may be used for replacing:

1,1,1,2-tetrafluoroethane (R134a);
1,1-difluoroethane (R152a);
1,1,1,3,3-pentafluoropropane (R245fa);
mixtures of pentafluoroethane (R125), 1,1,1,2-tetrafluoroethane (R134a) and isobutane (R600a), namely R422;
chlorodifluoromethane (R22);
mixture of 51.2% of chloropentafluoroethane (R115) and 48.8% of chlorodifluoromethane (R22), namely R502;
any hydrocarbon;
mixture of 20% of difluoromethane (R32), 40% of pentafluoroethane (R125) and 40% of 1,1,1,2-tetrafluoroethane (R134a), namely R407A;
mixture of 23% of difluoromethane (R32), 25% of pentafluoroethane (R125) and 52% of 1,1,1,2-tetrafluoroethane (R134a), namely R407C;
mixture of 30% of difluoromethane (R32), 30% of pentafluoroethane (R125) and 40% of 1,1,1,2-tetrafluoroethane (R134a), namely R407F;
R1234yf (2,3,3,3-tetrafluoropropene);
R1234ze (1,3,3,3-tetrafluoropropene).

The compositions according to the invention may also be useful as expanding agent, propellant (for example for an aerosol), cleaning agent or solvent, besides their use as heat transfer fluids.

As propellant, the compositions according to the invention may be used alone or in combination with known propellants. The propellant comprises, preferably consists of, a composition according to the invention. The active substance that is to be propelled may be mixed with the propellant and inert compounds, solvents or other additives, to form a sprayable composition. Preferably, the sprayable composition is an aerosol.

As expanding agent, the compositions according to the invention may be included in an expansion composition, which preferably comprises one or more other compounds capable of reacting and forming a foam or cellular structure in suitable conditions, as is known by a person skilled in the art.

In particular, the invention proposes a method for preparing an expanded thermoplastic product comprising firstly preparation of an expandable polymer composition. Typically, the expandable polymer composition is prepared by plasticizing a polymer resin and mixing the compounds of a composition of expanding agent at an initial pressure. The plasticization of the polymer resin may be carried out under the effect of heat, by heating the polymer resin to soften it sufficiently to mix a composition of expanding agent. Generally, the plasticization temperature is near the glass transition temperature or the melting point for crystalline polymers.

Other uses of the compositions according to the invention comprise the uses as solvents, cleaning agents or others. We may mention for example steam degreasing, precision cleaning, cleaning of electronic circuits, dry cleaning, abrasive cleaning, solvents for deposition of lubricants and release agents, and other solvent or surface treatments.

EXAMPLES

The following examples illustrate the invention without limiting it.

In all of these examples, the compatibility of various additives with a mixture of 78% of HFO-1234yf and 22% of ammonia is tested, as well as the effect of these additives on the miscibility of this mixture.

For this purpose, an autoclave is used, with temperature control by a double jacket, and supplied by a thermostatic bath. The autoclave is equipped with peepholes. A light source and a camera are used for viewing the contents of the autoclave.

First the refrigerant (HFO-1234yf+ammonia) is introduced into the autoclave. Then a first amount of additive is introduced, and it is stirred. The temperature of the autoclave is varied until an emulsion is obtained, which indicates nonmiscibility of the mixture. Then these steps are repeated by adding additional amounts of additive. The concentrations are determined by weighing each component, with an uncertainty of 0.1 g for the refrigerant and 0.01 g for the additive.

Example 1—Comparative

The effect of perfluorohex-1-ene as additive is tested. After adding 1% of additive, it is found that the additive is not compatible with the HFO-1234yf/ammonia mixture. In fact, adding the additive causes formation of an emulsion that does not disappear on raising the temperature, as well as the appearance of deposits.

Example 2—Comparative

The effect of n-perfluorobutylethane as additive (melting point: −89° C.) is tested. No incompatibility of the additive with the HFO-1234yf/ammonia mixture is noted. The effect of the additive on the miscibility of the HFO-1234yf/ammonia mixture is summarized in the following table:

| Proportion of additive | Demixing temperature |
|---|---|
| 0% | −21.3° C. |
| 1.1% | −21.5° C. |
| 2.1% | −21.3° C. |
| 3.0% | −20.5° C. |
| 4.0% | −20.7° C. |
| 4.9% | −20.5° C. |

It can therefore be seen that the additive does not improve the homogeneity of the HFO-1234yf/ammonia mixture but on the contrary tends to degrade it.

Example 3—Comparative

The effect of perfluoro-n-octylethane as additive (melting point: −39° C.) is tested. No incompatibility of the additive with the HFO-1234yf/ammonia mixture is noted. The effect of the additive on the miscibility of the HFO-1234yf/ammonia mixture is summarized in the following table:

| Proportion of additive | Demixing temperature |
|---|---|
| 0% | −21.1° C. |
| 1.1% | −20.6° C. |
| 2.1% | −20.3° C. |
| 3.0% | −19.6° C. |
| 4.0% | −19.0° C. |
| 4.9% | −18.4° C. |

It can therefore be seen that the additive does not improve the homogeneity of the HFO-1234yf/ammonia mixture but on the contrary tends to degrade it.

Example 4—Comparative

The effect of perfluorodecylethylene as additive (melting point: +21° C.) is tested. No incompatibility of the additive with the HFO-1234yf/ammonia mixture is noted. The effect of the additive on the miscibility of the HFO-1234yf/ammonia mixture is summarized in the following table:

| Proportion of additive | Demixing temperature |
|---|---|
| 0% | −20.9° C. |
| 1.1% | −21.0° C. |
| 2.0% | −20.6° C. |
| 3.0% | −19.6° C. |
| 4.0% | −19.1° C. |

It can therefore be seen that the additive does not improve the homogeneity of the HFO-1234yf/ammonia mixture but on the contrary tends to degrade it.

Example 5—Invention

The effect of 2-perfluorohexylethanol as additive (melting point: −35° C.) is tested. No incompatibility of the additive with the HFO-1234yf/ammonia mixture is noted. The effect of the additive on the miscibility of the HFO-1234yf/ammonia mixture is summarized in the following table:

| Proportion of additive | Demixing temperature |
|---|---|
| 0% | −20.7° C. |
| 1.1% | −20.9° C. |
| 2.2% | −21.3° C. |
| 3.2% | −21.8° C. |
| 4.2% | −22.4° C. |
| 5.1% | −23.0° C. |

It can therefore be seen that the additive improves the homogeneity of the HFO-1234yf/ammonia mixture.

Example 6—Invention

The effect of 1,1,1,3,3,3-hexafluoropropan-2-ol as additive (melting point: −4° C.) is tested. No incompatibility of the additive with the HFO-1234yf/ammonia mixture is noted. The effect of the additive on the miscibility of the HFO-1234yf/ammonia mixture is summarized in the following table:

| Proportion of additive | Demixing temperature |
|---|---|
| 0% | −21.5° C. |
| 1.0% | −23.2° C. |
| 1.9% | −24.7° C. |
| 2.9% | −26.5° C. |
| 3.9% | −28.4° C. |
| 4.9% | −28.7° C. |

It can therefore be seen that the additive gives a clear improvement in homogeneity of the HFO-1234yf/ammonia mixture.

Example 7—Invention

The effect of propan-2-ol as additive (melting point: −89° C.) is tested. No incompatibility of the additive with the HFO-1234yf/ammonia mixture is noted. The effect of the additive on the miscibility of the HFO-1234yf/ammonia mixture is summarized in the following table:

| Proportion of additive | Demixing temperature |
|---|---|
| 0% | −21.9° C. |
| 0.63% | −22.6° C. |
| 1.32% | −24.7° C. |
| 1.71% | −26.1° C. |
| 2.11% | −27.6° C. |
| 2.49% | −29.1° C. |
| 2.94% | <−30.2° C. |

It can therefore be seen that the additive greatly improves the homogeneity of the HFO-1234yf/ammonia mixture.

Example 8—Invention

The effect of propan-1-ol as additive (melting point: −126° C.) is tested. No incompatibility of the additive with the HFO-1234yf/ammonia mixture is noted. The effect of the additive on the miscibility of the HFO-1234yf/ammonia mixture is summarized in the following table:

| Proportion of additive | Demixing temperature |
|---|---|
| 0% | −22.2° C. |
| 0.42% | −22.6° C. |
| 1.01% | −24.4° C. |

-continued

| Proportion of additive | Demixing temperature |
|---|---|
| 1.78% | −27.4° C. |
| 2.24% | −29.6° C. |
| 2.47% | −30.3° C. |
| 3.17% | −32.4° C. |
| 3.59% | −33.5° C. |
| 3.97% | −36.7° C. |

It can therefore be seen that the additive greatly improves the homogeneity of the HFO-1234yf/ammonia mixture.

The invention claimed is:

1. A composition comprising 2,3,3,3-tetrafluoropropene, ammonia and an alcoholic compound having a melting point less than or equal to 0° C., wherein the composition comprises from 1 to 60 wt % of ammonia and from 40 to 99 wt % of 2,3,3,3-tetrafluoropropene; the proportions being given relative to the sum of ammonia and 2,3,3,3-tetrafluoropropene, wherein the alcoholic compound is selected from propan-1-ol, propan-2-ol, 2-perfluorohexylethanol, 1,1,1,3,3,3-hexafluoropropan-2-ol and mixtures thereof, and wherein the alcoholic compound is present in a proportion from 0.5 to 20%, relative to the sum of the alcoholic compound, ammonia and 2,3,3,3-tetrafluoropropene.

2. The composition as claimed in claim 1, wherein the alcoholic compound has a melting point less than or equal to −50° C.; and/or in that the alcoholic compound has a viscosity at 20° C. less than or equal to 32.5 mm$^2$/s.

3. The composition as claimed in claim 1, consisting essentially of a mixture of ammonia, of 2,3,3,3-tetrafluoropropene and of the alcoholic compound.

4. The composition as claimed in claim 1, having a demixing temperature less than or equal to −23° C.

5. The composition as claimed in claim 1, further comprising one or more additives selected from lubricants, polyalkylene glycols, stabilizers, tracers, fluorescent agents, odoriferous agents, solubilizers and mixtures thereof.

6. A heat transfer composition comprising the composition as claimed in claim 1.

7. A method for improving the miscibility of ammonia with 2,3,3,3-tetrafluoropropene, the method comprising adding an alcoholic compound, wherein the composition comprises from 1 to 60 wt % of ammonia and from 40 to 99 wt % of 2,3,3,3-tetrafluoropropene; the proportions being given relative to the sum of ammonia and 2,3,3,3-tetrafluoropropene, wherein the alcoholic compound is selected from propan-1-ol, propan-2-ol, 2-perfluorohexylethanol, 1,1,1,3,3,3-hexafluoropropan-2-ol and mixtures thereof, and wherein the alcoholic compound is present in a proportion from 0.5 to 20%, relative to the sum of the alcoholic compound, ammonia and 2,3,3,3-tetrafluoropropene.

8. The method as claimed in claim 7, wherein the alcoholic compound has a melting point less than or equal to 0° C.; and/or in that the alcoholic compound has a viscosity at 20° C. less than or equal to 32.5 mm$^2$/s.

9. The method as claimed in claim 7, wherein ammonia and 2,3,3,3-tetrafluoropropene are not combined with any third heat transfer compound.

10. A heat transfer installation comprising a vapor compression circuit containing a composition as claimed in claim 1 as heat transfer composition.

11. The installation as claimed in claim 10, selected from mobile or stationary installations for heating by heat pump, air conditioning, refrigeration, freezing and the Rankine cycles, and automobile air conditioning installations.

12. The installation as claimed in claim 10, which is an automobile air conditioning installation.

13. A method for heating or cooling a fluid or a body by means of a vapor compression circuit containing a heat transfer fluid, said method comprising successively at least partial evaporation of the heat transfer fluid, compression of the heat transfer fluid, at least partial condensation of the heat transfer fluid and expansion of the heat transfer fluid, wherein the heat transfer fluid is supplied by a composition as claimed in claim 1.

14. A method for reducing the environmental impact of a heat transfer installation comprising a vapor compression circuit containing an initial heat transfer fluid, said method comprising a step of replacing the initial heat transfer fluid in the vapor compression circuit with a final heat transfer fluid, the final heat transfer fluid having a lower GWP than the initial heat transfer fluid, wherein the final heat transfer fluid is supplied by a composition as claimed in claim 1.

15. A solvent comprising the composition as claimed in claim 1.

16. An expanding agent comprising the composition as claimed in claim 1.

17. A propellant comprising the composition as claimed in claim 1.

18. A cleaning agent comprising the composition as claimed in claim 1.

* * * * *